(12) United States Patent
Jia et al.

(10) Patent No.: US 12,531,809 B2
(45) Date of Patent: Jan. 20, 2026

(54) PARAMETER ADJUSTMENT METHOD AND APPARATUS

(71) Applicant: HUAWEI TECHNOLOGIES CO., LTD., Shenzhen (CN)

(72) Inventors: Xitong Jia, Nanjing (CN); Ke Meng, Nanjing (CN); Hong Zhou, Shenzhen (CN); Lei Han, Shenzhen (CN); Xianjun He, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 18/671,691

(22) Filed: May 22, 2024

(65) Prior Publication Data

US 2024/0314080 A1     Sep. 19, 2024

Related U.S. Application Data

(63) Continuation of application No. PCT/CN2022/120742, filed on Sep. 23, 2022.

(30) Foreign Application Priority Data

Nov. 25, 2021   (CN) .......................... 202111410979.6

(51) Int. Cl.
  *H04L 47/2408*   (2022.01)
  *H04L 47/20*     (2022.01)
  *H04L 47/265*    (2022.01)

(52) U.S. Cl.
  CPC ......... *H04L 47/2408* (2013.01); *H04L 47/20* (2013.01); *H04L 47/265* (2022.05)

(58) Field of Classification Search
  CPC .... H04L 47/2408; H04L 47/265; H04L 47/20
  (Continued)

(56) References Cited

U.S. PATENT DOCUMENTS 6,208,653 B1 *   3/2001   Ogawa ............... H04Q 11/0478
                                              370/231
6,826,147 B1 *  11/2004   Nandy .................... H04L 47/12
                                              370/235

(Continued)

FOREIGN PATENT DOCUMENTS

CN    108616421 A  * 10/2018   ......... H04L 67/1044
CN    108400897 B  *  1/2020   ......... H04L 41/0886

(Continued)

OTHER PUBLICATIONS

Ramakrishnan, "The Addition of Explicit Congestion Notification (ECN) to IP Status of this Memo," Network Working Group, RFC3168, Total 63 pages (Sep. 2001).

(Continued)

*Primary Examiner* — Tauqir Hussain
(74) *Attorney, Agent, or Firm* — Leydig, Voit & Mayer, Ltd.

(57) ABSTRACT

A parameter adjustment method and apparatuses are provided. The method includes: a first exploration device corresponding to a first service node receives a first parameter set from a management device, where the first parameter set includes one or more parameters used by the first exploration device to perform parameter adjustment, the first service node is any one of a plurality of service nodes included in a data center network, and the plurality of service nodes one-to-one correspond to a plurality of exploration devices. The first exploration device obtains a network status of the first service node based on each parameter adjustment until the network status reaches a preset condition, where each parameter adjustment includes: adjusting one parameter in the first parameter set. The parameter is flexibly adjusted based on the network status, to be applicable to different services.

24 Claims, 8 Drawing Sheets

(58) Field of Classification Search
USPC .......................................................... 709/238
See application file for complete search history.

(56) References Cited

U.S. PATENT DOCUMENTS

| | | | |
|---|---|---|---|
| 8,630,204 B1 | 1/2014 | Williams et al. | |
| 10,181,963 B2* | 1/2019 | Zhou | H04L 12/6418 |
| 10,419,968 B2* | 9/2019 | Agrawal | H04W 28/0273 |
| 2008/0062879 A1* | 3/2008 | Sivakumar | H04L 69/14 |
| | | | 370/235 |
| 2011/0211449 A1* | 9/2011 | Attar | H04L 47/10 |
| | | | 370/235 |
| 2013/0114408 A1* | 5/2013 | Sastry | H04L 47/37 |
| | | | 370/231 |
| 2018/0063024 A1* | 3/2018 | Pfister | H04L 69/161 |
| 2021/0012227 A1 | 1/2021 | Fang et al. | |
| 2024/0314080 A1* | 9/2024 | Jia | H04L 47/12 |
| 2025/0071040 A1* | 2/2025 | Wang | G16Y 40/50 |

FOREIGN PATENT DOCUMENTS

| | | | | |
|---|---|---|---|---|
| CN | 112636942 A | * | 4/2021 | ......... H04L 43/0823 |
| CN | 112910789 A | * | 6/2021 | ............. H04L 47/29 |
| CN | 112910789 A2 | | 6/2021 | |
| CN | 113300974 A | * | 8/2021 | ............. H04L 47/26 |
| CN | 113328953 A | * | 8/2021 | ............. H04L 47/12 |
| JP | 2013106202 A | | 5/2013 | |
| WO | WO-2020192397 A1 | * | 10/2020 | ............. H04L 47/26 |

OTHER PUBLICATIONS

Zhu et al., "Congestion Control for Large-Scale RDMA Deployments," ACM SIGCOMM, Computer Communication Review, XP058071188, total 14 pages (Aug. 2015).

Yan et al., "ACC: Automatic ECN Tuning for High-Speed Datacenter Networks," ACM SIGCOMM 2021 Conference, Computer Communication Review, vol. 45, Issue 4, XP058618993, Total 14 pages (Aug. 2021).

* cited by examiner

PARAMETER ADJUSTMENT METHOD AND APPARATUS

CROSS-REFERENCE TO RELATED APPLICATIONS

This application is a continuation of International Application No. PCT/CN2022/120742 filed on Sep. 23, 2022, which claims priority to Chinese Patent Application No. 202111410979.6 filed on Nov. 25, 2021. The disclosures of the aforementioned applications are hereby incorporated by reference in their entireties.

TECHNICAL FIELD

Embodiments of this application relate to the field of communication technologies, and in particular, to a parameter adjustment method and apparatus.

BACKGROUND

Network congestion may easily cause problems such as a high delay, a low throughput, and large network resource consumption that are of packet transmission. With development of internet technologies, network services become increasingly diversified. Network traffic models for different service types differ greatly, resulting in different network congestion degrees.

Therefore, a flexible parameter adjustment method is expected to be provided to be applicable to different services.

SUMMARY

Embodiments of this application provide a parameter adjustment method and apparatus, to flexibly adjust a parameter to be applicable to different services, improve a network status, and improve network performance.

According to a first aspect, this application provides a parameter adjustment method. The method may be performed by a first exploration device, or may be performed by a component (such as a chip or a chip system) configured in a first exploration device, or may be implemented by a logical module or software that can implement all or some functions of a first exploration device. This is not limited in this application.

For example, the method includes: A first exploration device corresponding to a first service node receives a first parameter set from a management device, where the first parameter set includes one or more parameters used by the first exploration device to perform parameter adjustment, the first service node is any one of a plurality of service nodes included in a data center network, and the plurality of service nodes one-to-one correspond to a plurality of exploration devices; and the first exploration device obtains a network status of the first service node based on each parameter adjustment until the network status reaches a preset condition, where each parameter adjustment includes: adjusting one parameter in the first parameter set.

Based on the foregoing technical solution, the first exploration device may perform parameter adjustment based on the first parameter set from the management device, and adjust one parameter in the first parameter set each time, and obtain the network status of the first service node each time the parameter is adjusted, so that the first exploration device may flexibly adjust a to-be-adjusted parameter based on the network status. In other words, for traffic models with different network congestion degrees, the first exploration device may flexibly adjust a parameter, to improve the network status, improve network performance, and further improve service performance.

With reference to the first aspect, in some possible implementations of the first aspect, the method further includes: The first exploration device receives an adjustment range and/or adjustment step of each parameter in the first parameter set from the management device; and each parameter adjustment includes: adjusting one parameter in the first parameter set based on a corresponding adjustment range and/or adjustment step.

The first exploration device may further receive the adjustment range and/or adjustment step of each parameter in the first parameter set, to adjust the parameter within the adjustment range corresponding to the parameter, and/or gradually adjust the parameter based on the adjustment step. Compared with that the first exploration device adjusts the parameter randomly, the first exploration device can adjust the parameter to a proper value more quickly in this method. This helps shorten parameter adjustment time to improve a parameter adjustment speed, and enable the network status to reach the preset condition as soon as possible to improve network performance.

With reference to the first aspect, in some possible implementations of the first aspect, that the first exploration device obtains a network status of the first service node based on each parameter adjustment until the network status reaches a preset condition includes: The first exploration device repeatedly performs, until the network status of the first service node reaches the preset condition, the following operations: determining an adjustment policy based on the network status that is of the first service node and that is obtained based on a previous parameter adjustment, and a predefined reward function; and performing a next parameter adjustment based on the adjustment policy, and obtaining the network status of the first service node.

By introducing a reward function, when the network status of the first service node does not reach the preset condition and the first exploration device continues to adjust the parameter in the first parameter set, factors that affect the network status of the first service node, such as the bandwidth and the quantity of congestion notification packets, may be comprehensively considered by using the first exploration device, and a next-step adjustment policy is determined by using a change of the reward function value. This helps determine an adjustment direction of the parameter. In other words, the first exploration device may effectively adjust the parameter in the first parameter set based on the change of the reward function value until the network status of the first service node reaches the preset condition.

With reference to the first aspect, in some possible implementations of the first aspect, the method further includes: The first exploration device receives a predefined reward function from the management device.

With reference to the first aspect, in some possible implementations of the first aspect, the method further includes: The first exploration device determines a second parameter set, where the second parameter set is obtained by adjusting at least one parameter in the first parameter set, and one or more parameters in the second parameter set enable the network status to meet the preset condition.

The first exploration device may obtain the second parameter set after adjusting the at least one parameter in the first parameter set. It may be understood that parameters in the second parameter set may include an adjusted parameter in the first parameter set and an unadjusted parameter.

With reference to the first aspect, in some possible implementations of the first aspect, the method further includes: The first exploration device calculates a modification coefficient based on the second parameter set, where the modification coefficient is used to modify the reward function, and a modified reward function is used to determine the adjustment policy when the one or more parameters in the second parameter set are adjusted.

The first exploration device determines the modification coefficient based on the second parameter set, so that the management device can modify the reward function used when the first exploration device adjusts the parameter. It may be understood that, an exploration device corresponding to another service node in the plurality of service nodes may also adjust a parameter, so that a network status of the another service node reaches a preset condition corresponding to each node. However, each service node is distributed, and network statuses of different service nodes are different. After network congestion occurs on different service nodes, exploration devices corresponding to different service nodes adjust parameters at different speeds, and further adjust sending rates at different speeds. As a result, a service node with a high adjustment speed occupies traffic of a node with a low adjustment speed, and unfairness occurs between the service nodes. The foregoing modification on the reward function helps improve fairness of traffic occupation between the service nodes.

With reference to the first aspect, in some possible implementations of the first aspect, the first exploration device is deployed on the first service node, or the first exploration device is deployed on a switch connected to the first service node.

According to a second aspect, this application provides a parameter adjustment method. The method may be performed by a management device, or may be performed by a component (such as a chip or a chip system) configured in a management device, or may be implemented by a logical module or software that can implement all or some functions of a management device. This is not limited in this application.

For example, the method includes: A management device determines a first parameter set, where the first parameter set includes one or more parameters used by a first exploration device corresponding to a first service node to perform parameter adjustment, the first service node is any one of a plurality of service nodes included in a data center network, and the plurality of service nodes one-to-one correspond to a plurality of exploration devices; and the management device sends the first parameter set to the first exploration device.

Based on the foregoing technical solution, the management device may uniformly determine a to-be-adjusted parameter of a plurality of exploration devices connected to the management device, and deliver the to-be-adjusted parameter to all exploration devices, so that the exploration device flexibly adjusts the to-be-adjusted parameter, to improve a network status, improve network performance, and further improve service performance.

With reference to the second aspect, in some possible implementations of the second aspect, the method further includes: The management device sends an adjustment range and/or adjustment step of each parameter in the first parameter set to the first exploration device.

The management device may further send the adjustment range and/or adjustment step of each parameter in the first parameter set to the first exploration device, so that the first exploration device adjusts the parameter within the adjustment range corresponding to the parameter, and/or gradually adjusts the parameter based on the adjustment step. This can shorten parameter adjustment time to improve a parameter adjustment speed, and enable a network status to reach a preset condition as soon as possible to improve network performance.

With reference to the second aspect, in some possible implementations of the second aspect, the method further includes: The management device sends a predefined reward function to the first exploration device.

With reference to the second aspect, in some possible implementations of the second aspect, the method further includes: The management device receives a modification coefficient, where the modification coefficient is obtained by the first exploration device through calculation based on a second parameter set, the second parameter set is obtained by the first exploration device by adjusting at least one parameter in the first parameter set, and one or more parameters in the second parameter set enable a network status to meet a preset condition; and the management device modifies a predefined reward function based on one or more modification coefficients, where a modified reward function is used to determine an adjustment policy when adjusting the one or more parameters in the second parameter set are adjusted.

The management device modifies the reward function of the first service node based on the modification coefficient uploaded by the exploration device corresponding to each service node in the plurality of service nodes, so that the first exploration device further adjusts the parameter in the second parameter set. The reward function is modified with reference to a modification coefficient corresponding to the first service node and a modification coefficient corresponding to another service node. This helps improve fairness of traffic occupation between the service nodes. With reference to the second aspect, in some possible implementations of the second aspect, the management device is deployed on a management node in the data center network, or the management device is deployed on a switch connected to a management node.

With reference to the first aspect or the second aspect, in some possible implementations, the network status includes a bandwidth, and the preset condition includes: The bandwidth reaches a first preset threshold.

With reference to the first aspect or the second aspect, in some possible implementations, the network status includes a quantity of congestion notification packets (CNP) received by the first service node, and the preset condition includes: The quantity of congestion notification packets received by the first service node is less than a second preset threshold.

It may be understood that the network status may include a bandwidth of the first service node, that is, a sending rate of the first service node, or may include the quantity of congestion notification packets received by the first service node. In a possible design, the preset condition is that the bandwidth of the first service node reaches the first preset threshold. In another possible design, the preset condition is that the quantity of congestion notification packets received by the first service node is less than the second preset threshold. In still another possible design, the preset condition is that the bandwidth of the first service node reaches the first preset threshold, and the quantity of received congestion notification packets is less than the second preset threshold.

This application provides a plurality of factors that can represent the network status and a preset condition corresponding to the network status, so that the first exploration device can continuously adjust a parameter until the network status of the first service node reaches the foregoing preset condition. This can improve the network status, that is, improve network performance.

With reference to the first aspect or the second aspect, in some possible implementations, the adjustment policy includes: an adjustment direction for a same parameter, or an adjustment for another parameter.

It should be understood that the first parameter set includes one or more to-be-adjusted parameters, and adjustment for one parameter may include: increasing the parameter or decreasing the parameter based on the adjustment step. If the network status of the first service node does not reach the preset condition after the parameter is adjusted once, the parameter may be adjusted next time, for example, adjustment is performed based on a previous adjustment direction or adjustment is performed based on a direction opposite to the previous adjustment direction, or another parameter in the first parameter set may be adjusted. A proper adjustment policy may enable the network status to reach the preset condition more quickly.

According to a third aspect, this application provides a parameter adjustment apparatus, to implement the parameter adjustment method according to any one of the first aspect and the second aspect and the possible implementations of the first aspect and the second aspect. The apparatus includes a corresponding module configured to perform the foregoing method. The module included in the apparatus may be implemented in a software and/or hardware manner. The apparatus may correspond to a first exploration device or a management device, for example, may be the first exploration device or the management device, or may be a chip, a chip system, or a processor that supports the first exploration device or the management device to implement the foregoing methods, or may be a logical module or software that can implement all or some functions of the first exploration device or the management device.

According to a fourth aspect, this application provides a parameter adjustment apparatus, including a processor, where the processor is configured to perform the parameter adjustment method according to any one of the first aspect and the second aspect and the possible implementations of the first aspect and the second aspect.

Optionally, the apparatus may further include a memory, configured store instructions and data. The memory is coupled to the processor, and when executing the instructions stored in the memory, the processor can implement the method described in the foregoing aspects.

Optionally, the apparatus may further include a communication interface. The communication interface is used by the apparatus to communicate with another device. For example, the communication interface may be a transceiver, a circuit, a bus, a module, or another type of communication interface.

According to a fifth aspect, this application provides a chip system. The chip system includes at least one processor, configured to support implementation of the functions in any one of the first aspect and the second aspect and the possible implementations of the first aspect and the second aspect, for example, data and/or information in the foregoing methods are/is received or processed.

In a possible design, the chip system further includes a memory, the memory is configured to store program instructions and data, and the memory is located inside or outside the processor.

The chip system may include a chip, or may include a chip and another discrete device.

According to a sixth aspect, this application provides a computer-readable storage medium, including a computer program. When the computer program is run on a computer, the computer is enabled to implement the method according to any one of the first aspect and the second aspect and the possible implementations of the first aspect and the second aspect.

According to a seventh aspect, this application provides a computer program product. The computer program product includes a computer program (which may also be referred to as code or instructions). When the computer program is run, a computer is enabled to perform the method according to any one of the first aspect and the second aspect and the possible implementations of the first aspect and the second aspect.

It should be understood that the third aspect to the seventh aspect of this application correspond to the technical solutions in the first aspect and the second aspect of this application, and beneficial effect achieved by the aspects and corresponding feasible implementations is similar. Details are not described again.

DESCRIPTION OF EMBODIMENTS

Figure 1:
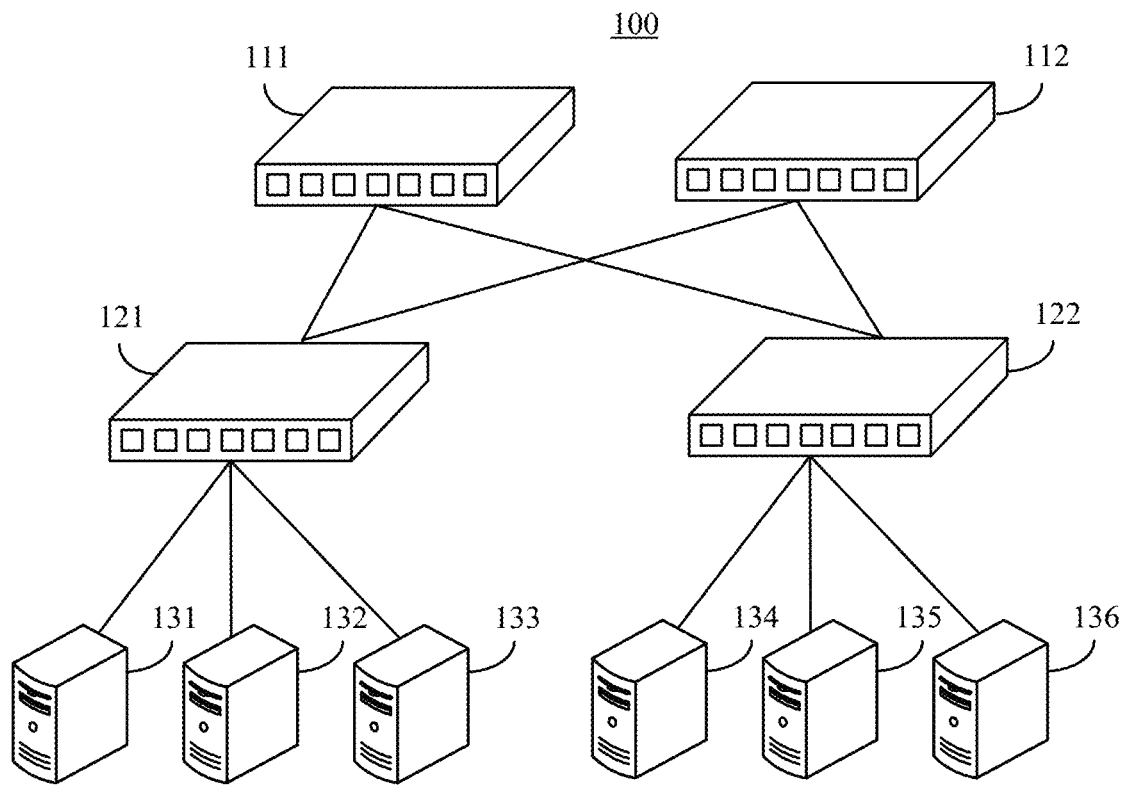
FIG. 1 is a schematic diagram of an architecture of a data center network according to an embodiment of this application.

The following describes technical solutions of this application with reference to the accompanying drawings.

For ease of clearly describing the technical solutions in embodiments of this application, the following descriptions are first provided.

First, in embodiments of this application, terms such as "first" and "second" are used to distinguish between same items or similar items having basically same functions and effects. For example, a first preset threshold and a second preset threshold are used to distinguish between different preset thresholds, and a sequence of the first preset threshold and the second preset threshold is not limited. A person skilled in the art may understand that the terms such as "first" and "second" do not limit a quantity and an execution sequence, and the terms such as "first" and "second" do not indicate a definite difference.

Second, in embodiments of this application. "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates that an "or" relationship between the associated objects, but does not exclude a case of an "and" relationship between the associated objects. A specific meaning of the character "/" may be understood with reference to the context. At least one of the following items (pieces) or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c each may be singular or plural.

Third, in embodiments of this application, the terms "include", "have" and any other variants thereof in this application are intended to cover non-exclusive inclusion. For example, a process, method, system, product, or device that includes a series of steps or units are not limited to those steps or units that are clearly listed, but may include other steps or units that are not explicitly listed or are inherent to such a process, method, system, product, or device.

To facilitate understanding of embodiments of this application, the following explains some terms used in embodiments of this application.

1. Data center network: The data center network is a global collaborative network of a specific device, and may be used to transmit, compute, and store data information, and the like. Data exchanged between servers may be forwarded by using a switch. With development of internet technologies, the data center network carries increasingly diversified services, such as distributed storage, high-performance computing, and artificial intelligence training. Different services have higher requirements on network performance. For example, for distributed storage, if a file is distributed to a plurality of servers for storage to perform input/output (I/O) acceleration and backup, when a server on a computing node in the network requests to read the file, the server concurrently accesses different data parts of the plurality of servers, and data is aggregated to the switch at the same time. This can easily cause network congestion. Therefore, a requirement for a bandwidth in the network is stricter.

To understand the data center network more clearly, the following describes in detail a schematic diagram of an architecture of the data center network with reference to FIG. 1.

FIG. 1 is a schematic diagram of an architecture of a data center network according to an embodiment of this application. As shown in FIG. 1, the data center network 100 includes an aggregation layer and an access layer. Network devices with a data forwarding function, such as a switch and a router, may be deployed at both the aggregation layer and the access layer. A terminal device or a server that is physically connected to the network device may be deployed below the access layer. The terminal device includes but is not limited to a device that supports communication with the network device, such as a mobile phone, a tablet computer (pad), a computer (such as a notebook computer or a palmtop computer) with a wireless transceiver function, a mobile internet device (MID), and a wearable device. According to the network shown in FIG. 1, an example in which a network device is a switch, and a device deployed at a lower layer of the access switch is a server is used. An aggregation switch 111 and an aggregation switch 112 are deployed at the aggregation layer, and an access switch 121 and an access switch 122 are deployed at the access layer. The aggregation switch can communicate with the access switch. Servers 131 to 133 are deployed at a lower layer of the access switch 121, and servers 134 to 136 are deployed at a lower layer of the access switch 122. Data exchanged between servers may be forwarded by using a switch. For example, data exchanged between the server 131 and the server 132 may be forwarded by using the switch 121. For another example, data exchanged between the server 131 and the server 136 may be forwarded by using the access switch 121, the aggregation switch 111, and the access switch 122, or may be forwarded by using the access switch 121, the aggregation switch 112, and the access switch 122. For brevity, details are not described herein.

Although not shown in FIG. 1, it may be understood that the data center network may further include a network device at a core layer, located above an aggregation layer, and providing a connection for a plurality of aggregation layers. The network architecture shown in FIG. 1 should not constitute any limitation on this application.

In the network architecture shown in FIG. 1, the switches 121 and 122 may perform data transmission, or may perform signaling transmission. The switch responsible for data transmission may be referred to as a data plane switch, and the switch responsible for signaling transmission may be referred to as a management plane switch. The data plane switch and the management plane switch may be deployed together or separately. This is not limited in this application.

Correspondingly, the terminal device or the server deployed below the access layer may perform data transmission, or may perform signaling transmission. The terminal device or the server configured to perform data transmission may be referred to as a service node, for example, may include but is not limited to a storage node or a computing node. The terminal device or the server configured to perform signaling transmission may be referred to as a management node. The service node may be connected to the data plane switch, and the management node may be connected to the management plane switch.

Figure 2:
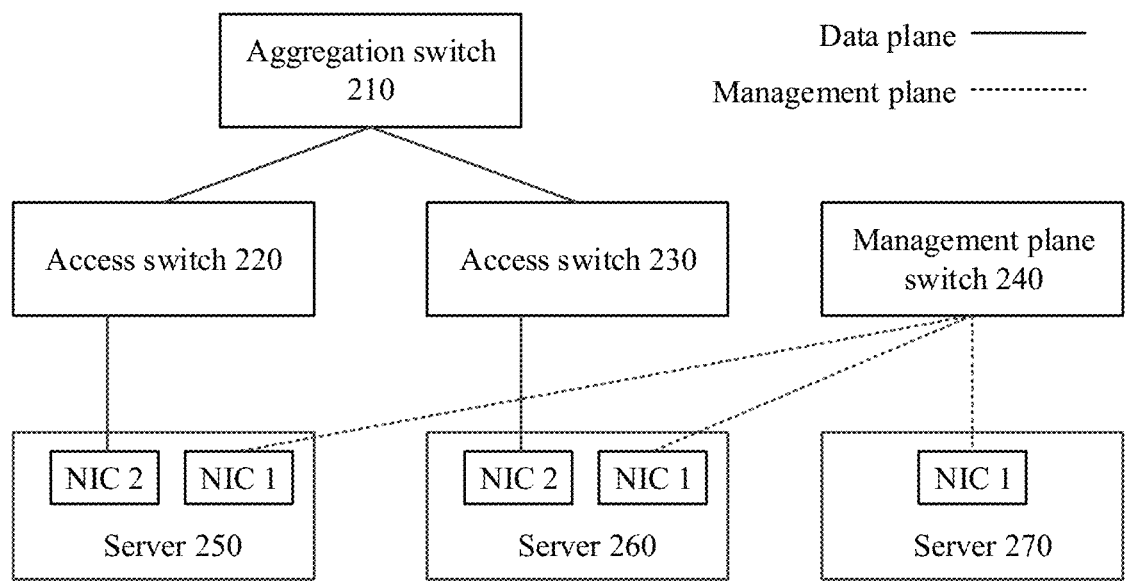
FIG. 2 is a schematic diagram of another architecture of a data center network according to an embodiment of this application.
Figure 3:
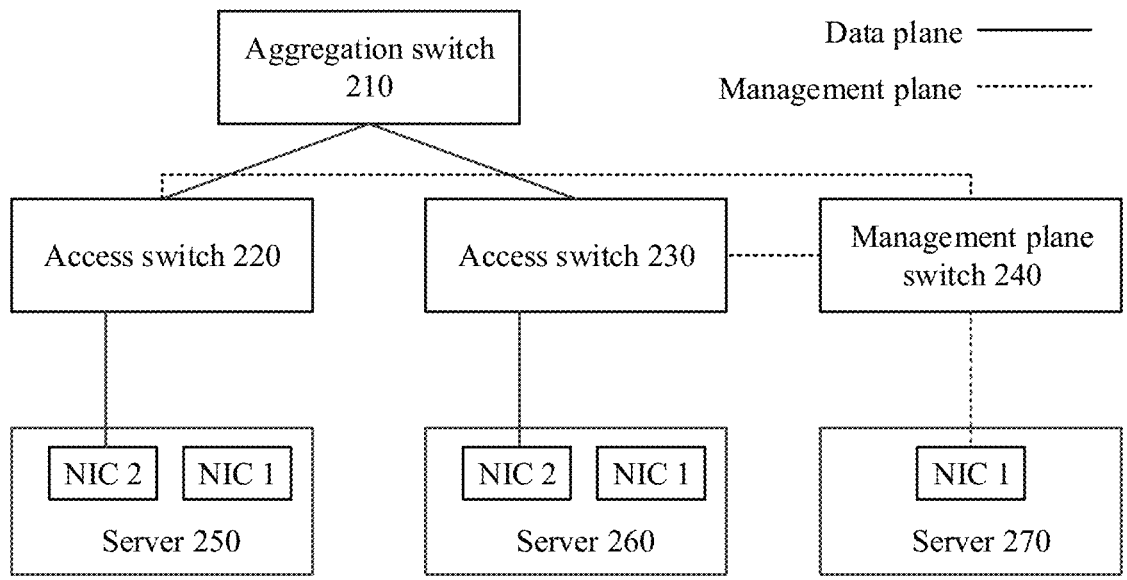
FIG. 3 is a schematic diagram of still another architecture of a data center network according to an embodiment of this application.

For ease of understanding, the following provides more detailed schematic diagrams of architectures of a data center network with reference to FIG. 2 and FIG. 3.

FIG. 2 is a schematic diagram of another architecture of a data center network according to an embodiment of this application. For ease of differentiation, in the figure, service traffic of a data plane is shown by using a solid line, and management traffic of a management plane is shown by using a dotted line. A line connecting an access switch 220 and a network interface card (NIC) 2 of a server 250 and a line connecting an access switch 230 to the NIC 2 of a server 260 are both solid lines, and are used to transmit service data. A line connecting a management plane switch 240 and each of NICs 1 of servers 250 to 270 is a dotted line, and is used to transmit signaling delivered by the management plane switch 240, and the like.

It may be understood that, in a data center network 200 shown in FIG. 2, an example in which a network device is a switch, and a server is deployed below an access layer. In addition, a data plane and a management plane in the network shown in FIG. 2 are separated. A network used to transmit a data packet may be referred to as a data plane, and a network used to control each device may be referred to as a control plane. As shown in FIG. 2, network deployment of a data plane is as follows: The access switches 220 and 230 are deployed at a lower layer of an aggregation switch 210, the server 250 is deployed at a lower layer of the access switch 220, and the server 260 is deployed at a lower layer of the access switch 230. The server 250 and the server 260 may be configured to process a service, and therefore may be referred to as service nodes. A data packet sent by the server 250 may be forwarded to the server 260 by using the access switch 220, the aggregation switch 210, and the access switch 230, and interfaces that are connected to the server by using the switches 220 and 230 are both the NIC 2, that is, data input and output are performed by using the NIC 2. Network deployment of the management plane includes: the management plane switch 240 and the servers 250 to 270) connected to the management plane switch 240. The server 270 may be configured to manage and control another server in the network, and may be referred to as a management node. A message, an instruction, and the like sent by the server 270 may be forwarded to the servers 250 and 260 by using the management plane switch 240, and the management plane switch 240 is connected to a NIC 1 of each server, that is, the NIC 1 is used for data input and output.

FIG. 3 is a schematic diagram of still another architecture of a data center network according to an embodiment of this application. A data plane and a management plane of the data center network 300 shown in the figure are separated. For ease of differentiation, service traffic of the data plane is shown by using a solid line, and management traffic of the management plane is shown by using a dotted line. As shown in FIG. 3, deployment of the data plane is the same as that in FIG. 2. For brevity, details are not described herein again. A management plane switch 240 on the management plane is connected to an access switch 220, an access switch 230, and a server 270. The server 270 is deployed on a management node, and a message, an instruction, and the like sent by the server 270 may be forwarded to the access switches 220 and 230 by using the management plane switch 240.

It should be noted that FIG. 2 and FIG. 3 show architectures in which the data plane and the management plane are separated in the data center network. Separation of the data plane and the management plane may separate the service traffic from the management traffic. This avoids affecting service execution. However, this should not constitute any limitation on embodiments of this application. The service traffic of the data plane and the management traffic of the management plane may also share one network. In other words, the management plane switch 240 may be replaced by one of the access switches, and both the service data and the management data may be transmitted by using the network connected to the NIC 2.

It should be understood that FIG. 1 to FIG. 3 show examples of the aggregation switch, the access switch, the server, and the communication link between devices. Optionally, the data center network may include another quantity of switches and servers, and each access switch may be connected to another quantity of servers. For example, more or fewer access switches may be included in the network, or each access switch may be connected to more or fewer servers. This is not limited in this embodiment of this application.

It should be further understood that the parameter adjustment method provided in this embodiment of this application may be used in the data center network (for example, the data center network shown in FIG. 1 to FIG. 3). The architectures of the data center network shown in FIG. 1 to FIG. 3 are intended to describe the technical solutions in embodiments of this application more clearly, and does not constitute a limitation on the technical solutions provided in embodiments of this application.

2. Network congestion: The network congestion indicates that a phenomenon in which network transmission performance deteriorates due to limited resources when a quantity of transmission packets is extremely large in a packet switched network. When network congestion occurs, packet loss, a packet transmission delay increase, a throughput decrease, and a large quantity of consumed network resources may occur. For example, the Ethernet is used in a best-effort forwarding manner. Specifically, each network device forwards data to a downstream device as much as possible. When a processing capability of the downstream device is insufficient, network congestion occurs. In this case, the network device may discard some data packets.

3. Explicit congestion notification (ECN): The ECN is an extension to the transmission control protocol (TCP)/internet protocol (IP). A network that uses the ECN may notify a receive end of a packet to perform network congestion without discarding the packet. For example, when a switch detects congestion, that ECN flag is set for the packet indicates that network congestion occurs. After receiving a packet with the ECN flag, the receive end of the packet notifies a transmit end of the packet to reduce the packet sending rate to achieve an objective of congestion control.

4. Data center quantized congestion notification (DCQCN): The DCQCN is an ECN-based congestion control scheme, and is mainly used in a converged Ethernet-based multiple access (remote direct memory access over converged Ethernet, RoCE) network. In the DCQCN control scheme, after receiving a packet carrying an ECN flag, a receive end (which may also be referred to as a sink end) sends a congestion notification packet to a transmit end (which may also be referred to as a source end). Correspondingly, after receiving the congestion notification packet from the receive end, the transmit end adjusts a data sending rate.

5. State machine: The state machine includes a state register and a combinational logic circuit, can perform state transition based on a preset state and a control signal, and is a control center that coordinates a related signal action and completes a specific operation. The state machine can be summarized into four elements: current state, condition, action and secondary state. The current state refers to a present state. A condition is also called an event. When a condition is met, an action will be triggered or a state transition will be executed. The action is executed after the condition is met. After the action is executed, a previous state can be transited to a new state or remain unchanged. The action is not mandatory. When the condition is met, the new state can be directly transited to when any action is not executed. A secondary state is a to-be-transited new state after a condition is met. It can be understood that the secondary state is relative to the current state, and once the secondary state is activated, the secondary state changes to a new current state.

Figure 4:
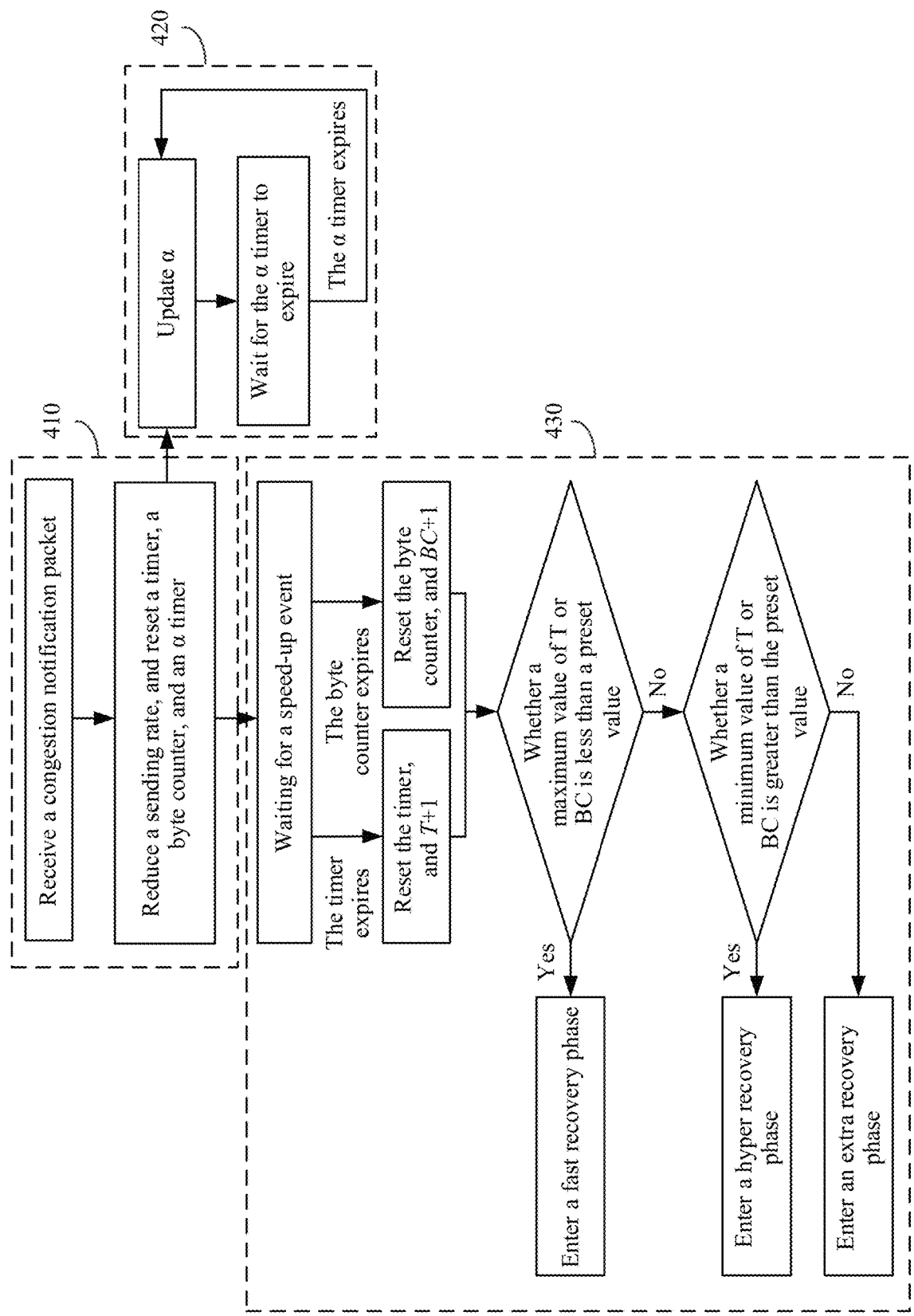
FIG. 4 is a schematic flowchart of adjusting a sending rate by a transmit end according to an embodiment of this application.

To better understand the adjustment policy for the sending rate of the transmit end, the following describes in detail a procedure in which the transmit end adjusts the sending rate in the DCQCN solution with reference to FIG. 4.

For ease of differentiation, the following first defines a symbol used in a procedure for adjusting a sending rate as follows:

$R_{new}$: adjusted sending rate of a transmit end;

$R_{old}$: sending rate of a transmit end before adjustment, namely, a sending rate at which the transmit end receives a congestion notification packet;

α: predefined parameter;

g: constant that control an update of α, where a range of g is 0≤g≤1;

$R_T$: target rate of a transmit end, namely, a rate that the transmit end needs to gradually achieved when the transmit end gradually increases a sending rate after the transmit end reduces the sending rate:

$R_{HAI}$: increase step of a target rate in a rate hyper recovery phase $R_{AI}$: increase step of a target rate in a rate extra recovery phase;

T: quantity of times for resetting a timer; and

BC: quantity of times for resetting a byte counter.

As shown in FIG. 4, the procedure for adjusting the sending rate in the DCQCN solution is mainly divided into three parts: step 410 to step 430.

In the step 410, a transmit end reduces a sending rate. After receiving a congestion notification packet, the transmit end reduces the sending rate of the transmit end, and resets a timer, a byte counter, and an α timer. For example, an adjustment formula for the sending rate may be:

$$R_{new} = R_{old}\left(1 - \frac{\alpha}{2}\right).$$

In the step 420, the transmit end updates the parameter α. The parameter α may be updated by using the following formula: α=(1−g)α+g . The α timer is used for updating α, and when the α timer expires, α is updated, the α timer is reset, and the α timer is waited to expire.

It may be understood that, after receiving the congestion notification packet, the transmit end decreases the sending rate to achieve an objective of network congestion control. However, after reducing the sending rate, the transmit end may gradually increase the sending rate to restore to a proper sending rate. For example, the sending rate at which the transmit end receives the congestion notification packet may be set to a target rate.

In the step 430, the transmit end increases a sending rate.

There are three phases: a fast recovery phase, a hyper recovery phase, and an extra recovery phase in increasing the sending rate. For example, a formula for a recovery rate in the fast recovery phase is $$R_{new} = \frac{R_T + R_{old}}{2},$$

a formula for a recovery rate in the hyper recovery phase is $$R_{new} = \frac{R_T + R_{HAI} + R_{old}}{2},$$

and a formula for a recovery rate in the extra recovery phase is $$R_{new} = \frac{R_T + R_{AI} + R_{old}}{2}.$$

A specific rate recovery process is as follows: After reducing the sending rate, the transmit end waits for a speed-up event, where the speed-up event means whether a quantity of times for resetting a timer or a byte counter reaches a preset value. When the timer expires, the timer is reset. When the byte counter expires, the byte counter is reset. Further, it is determined whether a maximum value of T or BC is less than a preset value, and if yes, the fast recovery phase is entered; or if no, the extra recovery phase is entered until a minimum value of T or BC is greater than the preset value, and the hyper recovery phase is entered.

It can be understood that, with development of internet technologies, network services become increasingly diversified. Network traffic models of different service types vary greatly. For example, as mentioned above, services carried in a data center network tend to be diversified, and different services have different traffic models. In the data center network, traffic, a delay, and the like required for interaction between servers of different services may be different. These may be understood as different traffic models. For example, in artificial intelligence training and distributed storage, when the services of two different types are processed, sizes of bandwidths required for interaction between servers and packet transmission delays are different. Therefore, it may be referred to as that the two types of services have different traffic models. Even for the same service, the traffic model may be different. For example, for distributed storage, different servers may have different bandwidths and different sizes of stored files, which may also be referred to as different traffic models.

The different traffic models further cause a large difference in network congestion degrees. When the foregoing method for adjusting a sending rate is used in different traffic models, control effect of network congestion is poor. Therefore, a flexible parameter adjustment method is expected to be provided, to be applicable to control of the sending rate when network congestion occurs in different traffic models, to improve a network status, improve network performance, and further improve service performance.

To resolve the foregoing technical problem, this application provides a parameter adjustment method. One or more adjustable parameters are determined for different service nodes, and an exploration device corresponding to each service node may separately adjust a parameter based on a network status of the service node and a to-be-adjusted parameter, so that the network status of each service node reaches a preset condition. Even if network statuses of nodes are different, requirements for network statuses are different. In the foregoing solution, a parameter may be flexibly adjusted based on the network statuses of the nodes, to effectively control sending rates of the nodes. This helps improve a network status, improve network performance, and further improve service performance.

The management device and the exploration device provided in embodiments of this application may be deployed in the following two solutions. In a possible design, the management device is deployed on the management node shown in FIG. 2, the exploration device may be deployed on the service node shown in FIG. 2, and the management device is connected to a plurality of exploration devices. In another possible design, the management device is deployed in the management plane switch shown in FIG. 3 or continues to be deployed in the management node, and the exploration device is deployed in the access switch. When each access switch is connected to a plurality of devices, there may be a plurality of exploration devices deployed in the access switch, that is, the exploration device one-to-one corresponds to the service node, and the management device is connected to a plurality of exploration devices.

By using specific embodiments, the following describes in detail the technical solutions of this application and how to resolve the foregoing technical problem by using the technical solutions of this application. The following several specific embodiments may be combined with each other, and a same or similar concept or process may not be described repeatedly in some embodiments. The following describes embodiments of this application with reference to the accompanying drawings.

Figure 5:
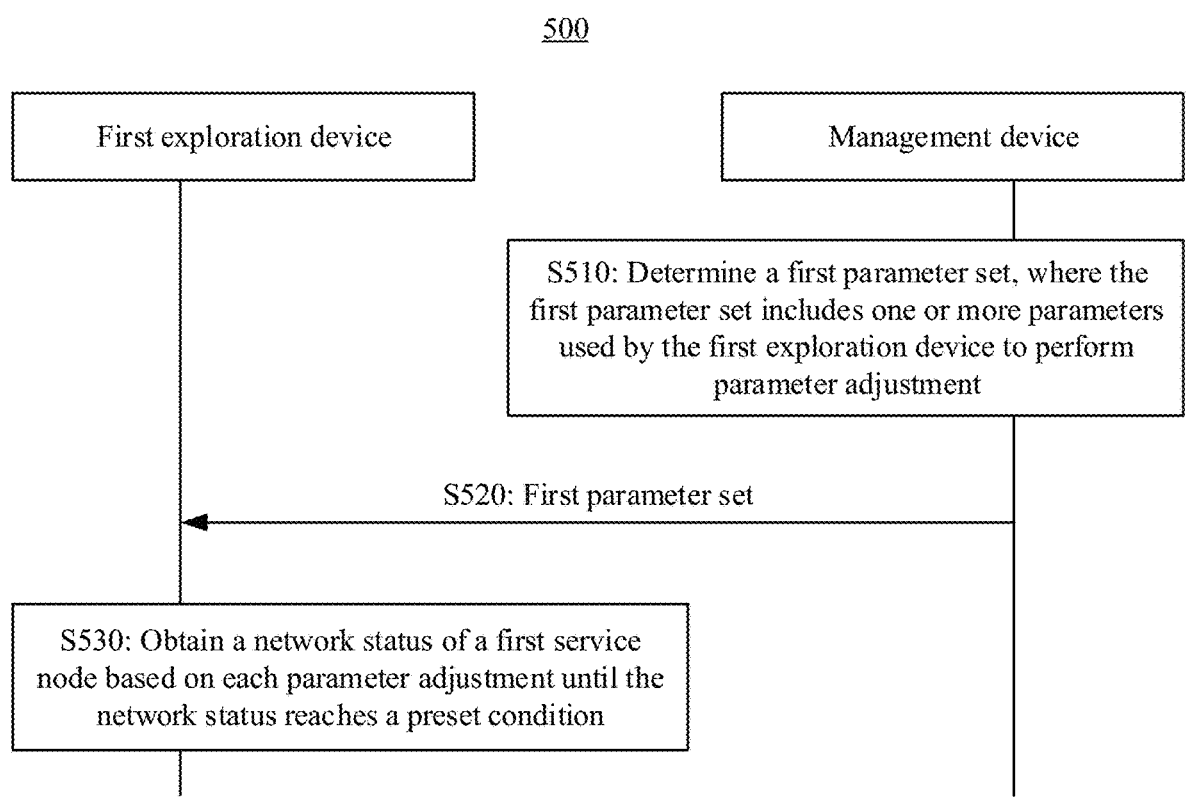
FIG. 5 is a schematic flowchart of a parameter adjustment method according to an embodiment of this application.

FIG. 5 is a schematic flowchart of a parameter adjustment method 500 according to an embodiment of this application. The method 500 shown in FIG. 5 may include S510 to S530. The following describes in detail the steps in the method 500.

It should be noted that the parameter adjustment method provided in FIG. 5 may be used in a data center network including a plurality of service nodes. The plurality of service nodes may one-to-one correspond to a plurality of exploration devices, and each exploration device may be configured to adjust a parameter of a corresponding service node. The plurality of exploration devices may be connected to a management device, and the management device may implement management on the plurality of service nodes by interacting with the exploration devices. For ease of understanding and description, without loss of generality, the following describes the parameter adjustment method provided in embodiments of this application by using an example in which a first service node and a first exploration device corresponding to the first service node interact with the management node. It may be understood that the first service node may be any one of the plurality of service nodes, and the first exploration device may be an exploration device that is in the plurality of exploration devices and that corresponds to the first service node.

S510: The management device determines a first parameter set, where the first parameter set includes one or more parameters used by the first exploration device to perform parameter adjustment.

The first parameter set includes the one or more parameters used by the first exploration device to perform parameter adjustment, and the one or more parameters may be parameters in adjusting a sending rate in a DCQCN solution, for example, an increase step $R_{HAI}$ of a target rate in a rate hyper recovery phase, an increase step $R_{AI}$ of a target rate in a rate extra recovery phase, duration of a timer, a quantity of bytes of a byte counter, and a minimum rate reduction ratio, which are not listed one by one herein.

For example, the management device may determine the first parameter set based on a service type of the first service node, a requirement for a network status, and the like. The first parameter set may include, for example, but is not limited to, the increase step $R_{HAI}$ of the target rate in the rate hyper recovery phase, the increase step $R_{AI}$ of the target rate in the rate extra recovery phase, the minimum rate reduction ratio, and the duration of the timer, to be used by the first exploration device corresponding to the first service node for adjustment.

Optionally, the management device determines an adjustment range and/or adjustment step of each parameter in the first parameter set.

In an optional step, the management device may further determine the adjustment range and/or adjustment step of each parameter set in the first parameter set, so that the first exploration device adjusts one or more parameters in the first parameter set. The adjustment range is an interval in which a parameter can be adjusted, and the adjustment step is an amplitude of each parameter adjustment. For example, each parameter may correspond to an adjustment range and an adjustment step.

The following uses the duration of the timer as an example to describe in detail a process in which the management device determines the adjustment range and/or adjustment step of each parameter. $T_C$ is denoted as the duration of the timer (for example, 1 milliseconds (ms), 2 ms, or 3 ms).

It may be understood that a minimum value of $T_C$ is related to round trip time (round trip time, RTT), and the RTT indicates duration from time when a transmit end sends data to time when the transmit end receives an acknowledgment from a receive end.

The minimum value of $T_C$ need to be at least greater than $$\frac{RTT}{2}.$$

If the minimum value of $T_C$ is less than $$\frac{RTT}{2},$$

it is possible that the timer has started speed-up when the transmit end does not receive a congestion notification packet, which causes flapping. In addition, there is also a specific delay in polling of sending the congestion notification packet by the receive end. That is, the receive end may receive data from a plurality of transmit ends at the same time, and there is also a specific delay when the receive end sends the congestion notification packet to the plurality of transmit ends one by one. Based on the foregoing reasons, the minimum value of $T_C$ may be set to $$\frac{RTT}{2} + t,$$

where t is a delay caused by polling of sending the congestion notification packet by the receive end.

A maximum value of $T_C$ can be set to a fixed value, for example, 2 ms. Therefore, an adjustment range of $T_C$ may be $$\left(\frac{RTT}{2} + t\right) \le T_C \le 2.$$

The adjustment step $T_S$ of $T_C$ may be determined based on the following formula:

$$T_S = \tau \times \frac{T_{max} - T_{min}}{T_{target} / T_p},$$

where $T_{max}$ indicates a maximum value of $T_C$, $T_{min}$ indicates a minimum value of $T_C$, $T_{target}$ indicates preset duration for completing parameter adjustment, and $T_p$ indicates an adjustment periodicity, namely, a time interval between two adjacent adjustments. τ is set based on a quantity of parameters in the first parameter set. For example, a larger quantity of parameters in the first parameter set indicates a larger τ, or a larger quantity of parameters in the first parameter set indicates a smaller τ.

It may be understood that the manner in which the management device determines the adjustment range and/or adjustment step of each parameter in the first parameter set is only an example, and should not constitute any limitation on embodiments of this application. For example, in addition to calculating the adjustment range and/or adjustment step according to the predetermined formula, the management device may further determine the adjustment range and/or adjustment step of each parameter in the first parameter set in another manner. For example, the adjustment range and/or adjustment step of each parameter may be a fixed value, or the adjustment range and/or adjustment step of each parameter may be received from an external device.

In addition, it should be noted that the adjustment step may be adjusted in the following two manners. In a possible design, the adjustment step is an additive step, for example, the adjustment step is added to or subtracted from the duration of the timer each time. In another possible design, the adjustment step is a multiplicative step. For example, the duration of the timer is multiplied or divided by the adjustment step each time. This is not limited in embodiments of this application.

S520: The management device sends the first parameter set. Correspondingly, the first exploration device receives the first parameter set.

The management device sends the first parameter set to the first exploration device corresponding to the first service node, so that the first exploration device adjusts a parameter in the first parameter set. It may be understood that the management device may further send the first parameter set to an exploration device corresponding to another service node, for example, a second exploration device corresponding to a second service node, so that the second exploration device adjusts a parameter in the first parameter set, and a network status of a service node corresponding to the second exploration device reaches a preset condition.

Optionally, the management device may further send the adjustment range and/or adjustment step of each parameter in the first parameter set to the first exploration device. Correspondingly, the first exploration device receives the adjustment range and/or adjustment step of each parameter in the first parameter set.

S530: The first exploration device obtains a network status of the first service node based on each parameter adjustment until the network status reaches the preset condition.

Each parameter adjustment includes: adjusting one parameter in the first parameter set. After receiving the first parameter set, the first exploration device may obtain the network status of the first service node, and when the network status of the first service node does not reach the preset condition, adjust at least one parameter in the first parameter set until the network status of the first service node reaches the preset condition.

According to the foregoing description, the first exploration device may further receive the adjustment range and/or adjustment step of each parameter in the first parameter set. Each parameter adjustment includes: adjusting one parameter in the first parameter set based on a corresponding adjustment range and/or adjustment step.

For example, the first exploration device adjusts one parameter in the first parameter set each time, for example, may perform adjustment based on an adjustment range and/or adjustment step corresponding to the parameter. After each adjustment is performed based on the adjustment step, the network status of the first service node is obtained, and whether the network status of the first service node reaches the preset condition is determined. If the preset condition is reached, the adjustment may be stopped. If the preset condition is not reached, the parameter in the first parameter set continues to be adjusted until the preset condition is reached.

It may be understood that the first exploration device may obtain the network status of the first service node in real time, and if the network status does not reach a preset value, the parameter in the first parameter set needs to be adjusted.

In this embodiment of this application, the network status may be represented by using different parameters, and corresponding preset conditions change accordingly when different parameters are used.

Optionally, the network status includes a bandwidth, and the preset condition includes: The bandwidth of the first service node reaches a first preset threshold.

Optionally, the network status includes a quantity of congestion notification packets received by the first service node, and the preset condition includes: The quantity of congestion notification packets received by the first service node is less than a second preset threshold.

The network status and the preset condition corresponding to the network status listed above may be used separately, or may be used together. In a possible design, the network status includes the bandwidth, the first exploration device obtains the bandwidth of the first service node, and if the bandwidth of the first service node reaches the first preset threshold, the network status reaches the preset threshold. In another possible design, the network status includes the quantity of congestion notification packets received by the first service node, the first exploration device obtains the quantity of congestion notification packets received by the first service node, and if the quantity of congestion notification packets is less than the second preset threshold, the network status reaches the preset condition. In still another possible design, the network status includes the bandwidth and the quantity of congestion notification packets received by the first service node, and if the bandwidth reaches the first preset threshold and the quantity of congestion notification packets is less than the second preset threshold, the network status reaches the preset condition.

Optionally, the method shown in FIG. 5 further includes: The first exploration device determines a second parameter set. The second parameter set is obtained by adjusting the at least one parameter in the first parameter set, and one or more parameters in the second parameter set enable the network status to meet the preset condition.

After determining that the network status of the first service node reaches the preset condition, the first exploration device may determine the second parameter set. It may be understood that the first exploration device may adjust the one or more parameters in the first parameter set, so that the network status reaches the preset condition. For example, the first parameter set includes $T_C$, $R_{HAI}$, $R_{AI}$, and a minimum rate reduction ratio $D_m$. After the first exploration device may adjust $T_C$, the network status of the first service node reaches the preset condition. In this case, the first exploration device may determine adjusted $T_C$, unadjusted $R_{HAI}$ and $R_{AI}$, and the minimum rate reduction ratio $D_m$ as the second parameter set.

Based on the foregoing technical solution, the first exploration device may perform parameter adjustment based on the first parameter set from the management node, adjust one parameter in the first parameter set each time, obtain a network status of the first service node each time the parameter is adjusted, and then determine, based on whether the network status reaches a preset condition, whether to continue the adjustment. Therefore, even if network congestion degrees For different traffic models are different, the foregoing solution may flexibly adjust a to-be-adjusted parameter based on a network status of each service node, to improve the network status, improve network performance, and further improve service performance.

To improve parameter adjustment efficiency, the first exploration device may further determine an adjustment policy based on a reward function, so that the network status reaches the preset condition more quickly.

Alternatively, the reward function may be determined by the management device and delivered to the first exploration device. Optionally, the method further includes: The management device sends the reward function to the first exploration device. Correspondingly, the first exploration device receives the reward function from the management device.

The first exploration device obtains the network status of the first service node based on each parameter adjustment until the network status reaches the preset condition, which may be implemented by repeatedly performing, until the network status of the first service node reaches the preset condition, the following operations: determining the adjustment policy based on the network status that is of the first service node and that is obtained based on a previous parameter adjustment, and a predefined reward function, performing a next parameter adjustment based on the adjustment policy, and obtaining the network status of the first service node.

For example, for one specific parameter in the first parameter set, after adjusting the parameter based on the adjustment step, the first exploration device obtains the network status of the first service node. If the network status does not reach the preset condition, the first exploration device further determines, with reference to the predefined reward function, the adjustment policy for a next adjustment, and performs a next parameter adjustment.

To facilitate the definition of the reward function, the following definitions are first made for the related symbols: B: a bandwidth; $C_S$: a quantity of congestion notification packets; and RWD: a reward function value.

The following provides several possible designs of the reward function. However, it should be understood that the design of the reward function is not limited thereto. Based on a same concept, a person skilled in the art may perform a design with reference to the foregoing parameter used to represent the network status, or may obtain another design of the reward function. These designs shall fall within the protection scope of this application.

In a possible design, RWD=$\rho \cdot (\mu \cdot B \div \tau \cdot C_S)$, where $\rho$, $\mu$, and $\tau$ are predefined coefficients. In another possible design, $$RWD = \rho \cdot \frac{\mu \cdot B}{\tau \cdot C_S},$$

where $\rho$, $\mu$, and $\tau$ are predefined coefficients.

It should be understood that the foregoing formula of the reward function is only an example, and should not constitute any limitation on embodiments of this application. In other words, any variation of the foregoing formula of the reward function should fall within the protection scope of embodiments of this application. It should be further understood that the reward function may be delivered by the management device to a plurality of exploration devices.

Optionally, the adjustment policy includes an adjustment direction for a same parameter, or an adjustment for another parameter.

The adjustment direction for the same parameter includes: decreasing the parameter based on an adjustment step, or increasing the parameter based on an adjustment step. The adjustment for the another parameter includes: decreasing the another parameter in the first parameter set based on an adjustment step corresponding to the another parameter, or increasing the another parameter in the first parameter set based on an adjustment step corresponding to the another parameter.

For example, when the network status of the first service node does not reach the preset condition, the first exploration device further determines a next adjustment policy based on the reward function. If the reward function value is increased, it indicates that the previous parameter adjustment helps improve the network status, and adjustment is continued based on the previous adjustment direction. If the reward function value is decreased, it indicates that the previous parameter adjustment does not improve the network status, and the adjustment direction for the parameter may be changed or another parameter may be adjusted.

Figure 6:
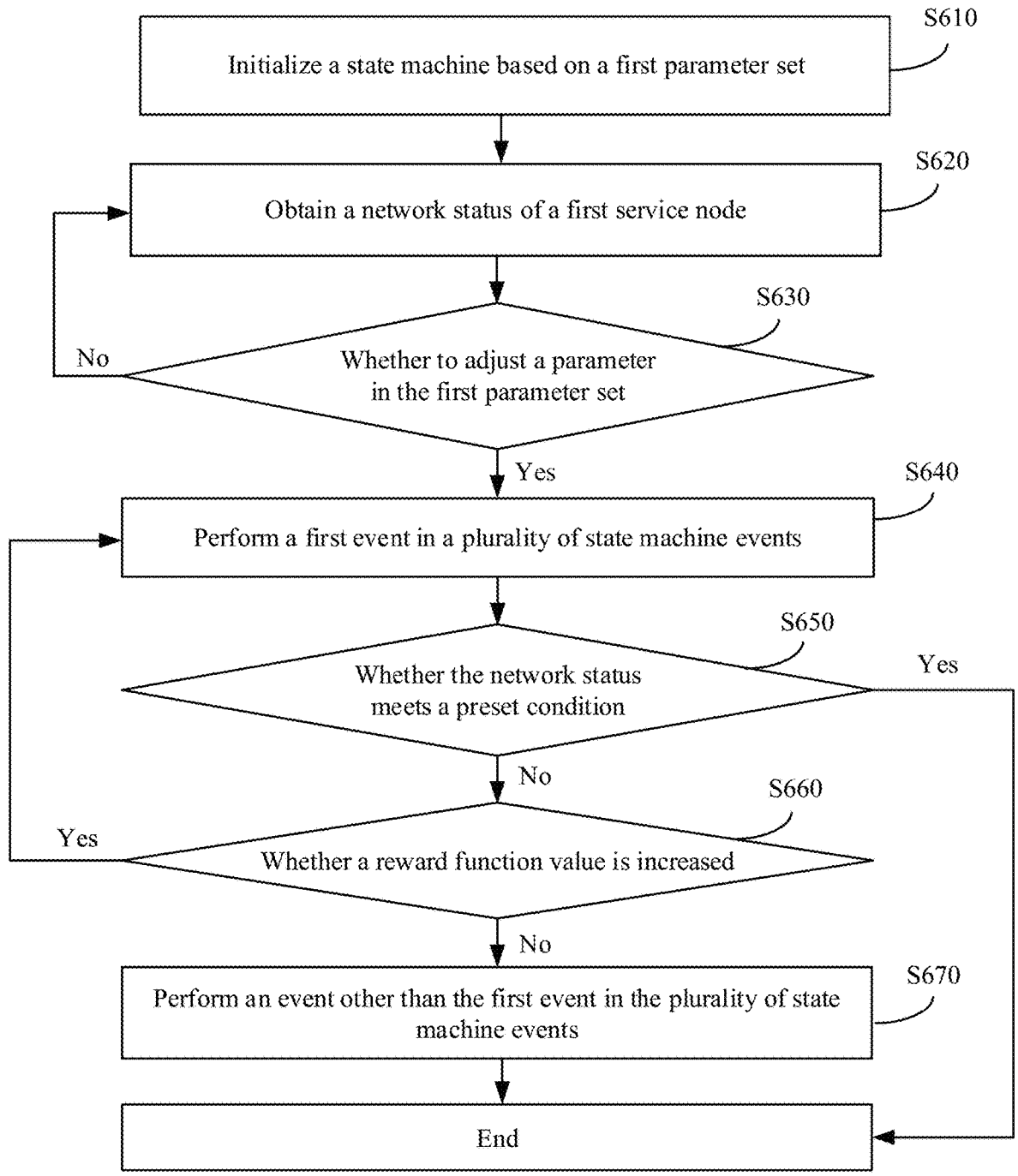
FIG. 6 is a schematic flowchart of adjusting a parameter by a first exploration device according to an embodiment of this application.

FIG. 6 is a schematic flow chart of adjusting a parameter by a first exploration device according to an embodiment of this application. With reference to FIG. 6, the following describes in detail a procedure in which the first exploration device performs parameter adjustment based on a network status that is of a first service node and that is obtained based on a previous parameter adjustment, and a predefined reward function.

As shown in FIG. 6, S610: The first exploration device initializes a state machine based on the first parameter set. Specifically, the first exploration device initializes the state machine based on the received first parameter set, an adjustment range and/or adjustment step of each parameter in the first parameter set, and a reward function.

S620: The first exploration device obtains the network status of the first service node. For example, a bandwidth of the first service node and a quantity of received congestion notification packets.

S630: The first exploration device determines whether to adjust a parameter in the first parameter set. It may be understood that the management device sends the first parameter set to the first exploration device, and the first exploration device may determine, based on the obtained network status of the first service node, whether to adjust the foregoing parameters. In a possible implementation, the first exploration device obtains the network status of the first service node, and determines whether the network status reaches a preset condition; and if the preset condition is reached, continues to perform S620 to obtain the network status of the first service node in real time; or if the preset condition is not reached, performs S640.

S640: The first exploration device performs a first event in a plurality of state machine events.

The first event is any one of the plurality of state machine events. It should be noted that the state machine event is driven by a state-action-reward function value manner.

The state is each parameter in the first parameter set. For example, a state 1 is $T_C$, a state 2 is $R_{HAI}$, and a state 3 is $R_{AI}$.

The action is an action executed in each state. For example, an action 1-1 indicates that a parameter represented by the state 1 is increased based on the adjustment step, an action 1-2 indicates that a parameter represented by the state 1 is decreased based on the adjustment step, an action 2-1 indicates that a parameter represented by the state 2 is increased based on the adjustment step, an action 2-2 indicates that a parameter represented by the state 2 is decreased based on the adjustment step, and the like. For brevity, examples are not listed herein one by one.

Figure 7:
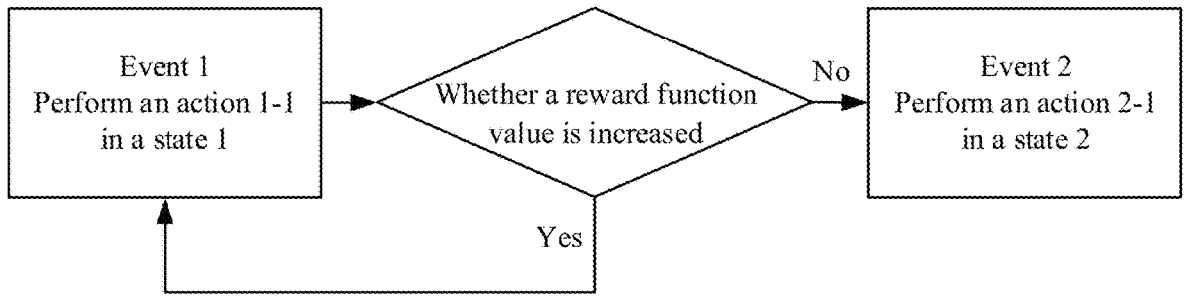
FIG. 7 is a schematic flowchart of state machine event jump according to an embodiment of this application.

The reward function value is effect on an action performed in a specific state. For example, if a reward function value obtained after the action 1-1 is executed in the state 1 is greater than that in a previous state, a next event is to continue to execute the action 1-1 in the state 1; otherwise, the state machine event jumps to a next event. As shown in FIG. 7, it is assumed that an action 1-1 is executed in a state 1 for an event 1, and an action 2-1 is executed in a state 2 for an event 2. The first exploration device performs the event 1, and further determines whether a reward function value is increased. If the value is increased, the first exploration device performs the event 2; or if the value is not increased, the first exploration device continues to perform the event 1.

Figure 8:
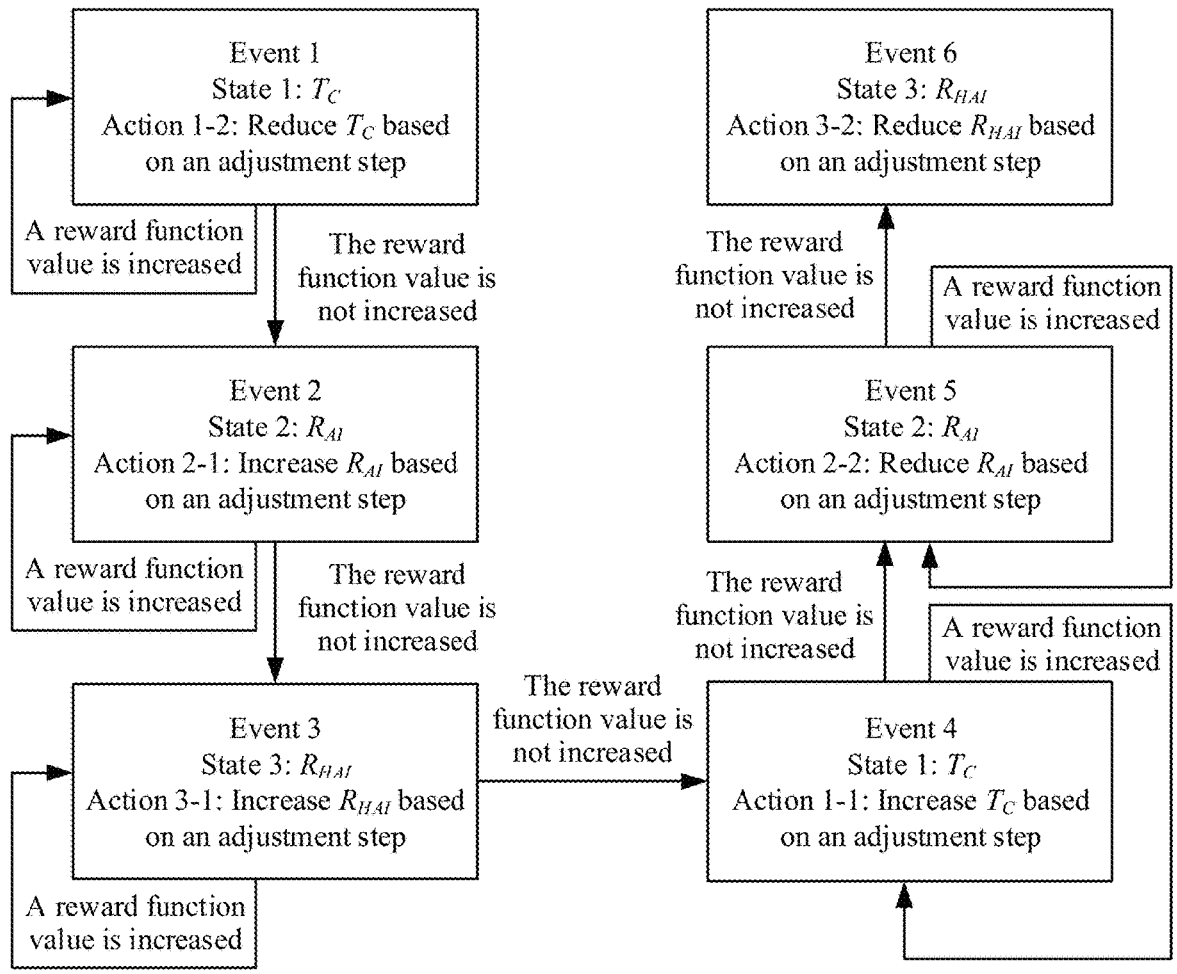
FIG. 8 is another schematic flowchart of state machine event jump according to an embodiment of this application.

FIG. 8 is a schematic flowchart of state machine event jump according to this embodiment of this application. As shown in FIG. 8, a plurality of events include an event 1 to an event 6. The first exploration device performs the event 1, that is, decreases $T_C$ based on the adjustment step, and continues to perform the event 1 when a reward function value is increased; and performs the event 2 when the reward function value is not increased, that is, increases $R_{AI}$ based on the adjustment step. Further, after the event 2 is performed, the first exploration device continues to perform the event 2 when a reward function value is increased; or the first exploration device performs the event 3 when the reward function value is not increased. In this way, a process of performing the event 3 to the event 6 is similar to that of performing the event 1 and the event 2. For brevity, details are not described herein again.

S650: The first exploration device determines whether the network status reaches the preset condition. If yes, stop adjusting the parameter; or if no, continue to perform S660.

It may be understood that, the first service node may calculate a sending rate and send a data packet based on an adjusted parameter of the first exploration device, and the first exploration device obtains the network status of the first service node in real time, to determine whether the parameter adjustment is valid and whether the parameter continues to be adjusted. If the network status reaches the preset condition, the parameter adjustment is stopped; or if the network status does not reach the preset condition, the parameter adjustment continues.

S660: The first exploration device determines whether the reward function value is increased. If the reward function value is increased, S640 is performed, that is, the first event continues to be performed. If the reward function value is not increased, S670 is performed, that is, an event other than the first event in the plurality of state machine events is performed until the network status reaches the preset condition.

Based on the foregoing technical solution, by introducing a reward function, when the network status of the first service node does not reach the preset condition and the first exploration device continues to adjust the parameter in the first parameter set, factors that affect the network status of the first service node, such as the bandwidth and the quantity of congestion notification packets, may be comprehensively considered by using the first exploration device, and a next-step adjustment policy is determined by using a change of the reward function value. This helps determine an adjustment direction of the parameter. In other words, the first exploration device may effectively adjust the parameter in the first parameter set based on the change of the reward function value until the network status of the first service node reaches the preset condition.

Further, the first exploration device may further calculate a modification coefficient based on the second parameter set, where the modification coefficient is used to modify the reward function, and a modified reward function is used to determine an adjustment policy when one or more parameters in the second parameter set are adjusted.

The following describes a method for calculating the modification coefficient by using an example in which the second parameter set includes the adjusted $T_C$, the unadjusted $R_{HAI}$ and $R_{AI}$, and a minimum rate reduction ratio $D_m$, where U indicates the modification coefficient, and $\alpha$, $\beta$, $\gamma$, and $\delta$ are predefined constants.

In a possible design, $U = \alpha \cdot T_C + \beta \cdot R_{AI} + \gamma \cdot R_{HAI} + \delta \cdot D_m$. In another possible design, $$U = \frac{\alpha \cdot T_C + \delta \cdot D_m}{\beta \cdot R_{AI} + \gamma \cdot R_{HAI}}.$$

It should be understood that the foregoing calculation formulas of the two modification coefficients are only examples, and should not constitute any limitation on embodiments of this application. Alternatively, the modification coefficient may be calculated by using a simple variation of the foregoing formula, for example, $$U = \frac{\alpha \cdot T_C + \beta \cdot R_{AI}}{\delta \cdot D_m + \gamma \cdot R_{HAI}}$$

and $$U = \frac{\beta \cdot R_{AI} + \gamma \cdot R_{HAI}}{\alpha \cdot T_C + \delta \cdot D_m}.$$

For brevity, examples are not listed herein one by one, but any variation of the foregoing formula should fall within the protection scope of embodiments of this application.

It may be understood that a plurality of exploration devices corresponding to a plurality of service nodes in the data center network may calculate, based on the foregoing method for calculating the modification coefficient, corresponding modification coefficients, and send the modification coefficients to the management device. The management device may modify the reward function based on the modification coefficients sent by the plurality of exploration devices. The following uses the first service node as an example to describe in detail a process in which the management device modifies the reward function corresponding to the first service node.

After receiving the modification coefficient from the first exploration device and another exploration device, the management device calculates a modification coefficient adjustment amount $\Delta U$. In a possible design, $$\Delta U = U - \frac{\sum_{i=1}^{n} U_i}{n}.$$

In another possible design, when n is an odd number, $\Delta U = U - U_{(n+1)/2}$, and when n is an even number, $$\Delta U = U - \frac{1}{2}(U_{n/2} + U_{(n+1)/2}),$$

where U indicates a modification coefficient sent by the first exploration device, U, indicates a modification coefficient sent by each exploration device in a plurality of exploration devices, and n indicates a quantity of modification coefficients.

The management device modifies, based on the modification coefficient adjustment amount, the reward function corresponding to the first exploration device, so that the first exploration device determines the adjustment policy when adjusting the one or more parameters in the second parameter set. For example, a modified reward function is $$\varepsilon \cdot \frac{\Delta U}{U} \cdot D \cdot RWD_{old},$$

where ε is any constant, ΔU is the modification coefficient adjustment amount corresponding to the first exploration device, U is the modification coefficient corresponding to the first exploration device, D=sgn(ΔU), D is a symbol (for example, a positive sign or a negative sign) of the modification coefficient adjustment amount corresponding to the first exploration device, and $RWD_{old}$ is a reward function before adjustment.

Optionally, the management device may deliver the modified reward function to the first exploration device, so that the first exploration device determines, based on the modified reward function, the adjustment policy when modifying the parameter in the second parameter set.

It is not difficult to understand that, the plurality of service nodes are distributed, and each service node in the plurality of service nodes adjusts a sending rate in a distributed manner. In other words, service nodes are in different network statuses. For example, after network congestion occurs, different network nodes reduce respective sending rates, and then gradually restore to a target rate. However, the adjustment rates of the service nodes are inconsistent, some service nodes adjust faster, and some service nodes adjust slower, in this case, traffic occupation by each service node is unfair, and the foregoing modification on the reward function helps improve fairness of traffic occupation between service nodes.

Figure 9:
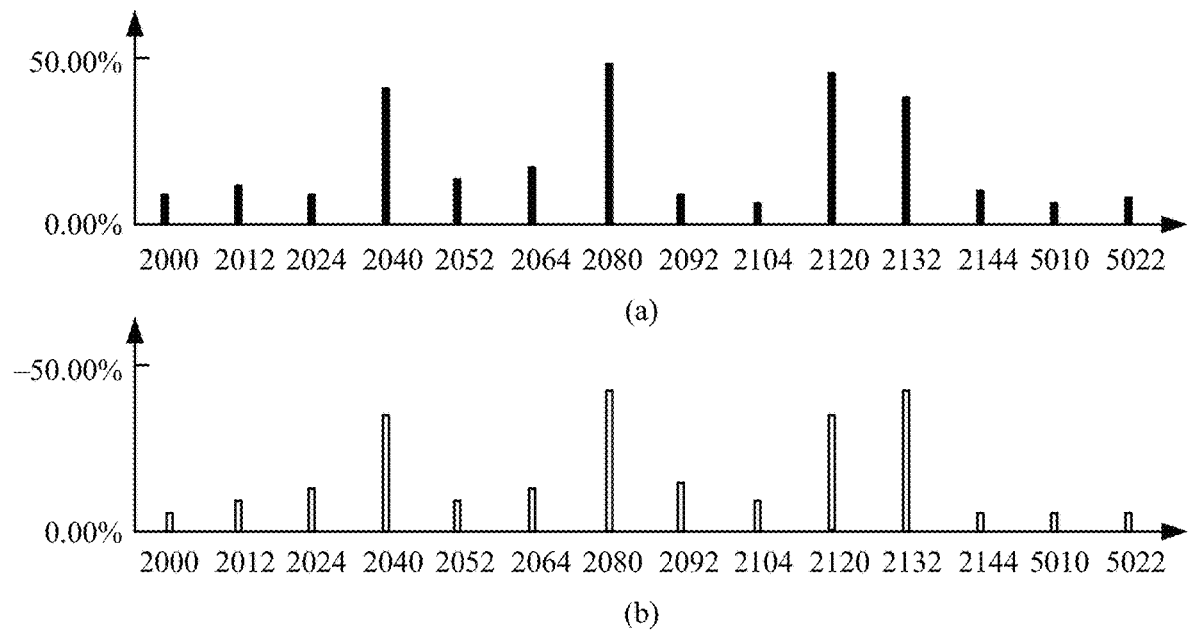
FIG. 9 is a schematic diagram of service performance of different services according to an embodiment of this application.

FIG. 9 is a schematic diagram of service performance of different services according to an embodiment of this application. In FIG. 9, different storage services are used as an example to describe effect achieved after the method provided in this embodiment of this application is used. A horizontal axis indicates a number of different storage services. Black indicates (a quantity of I/O times in a unit time after the method provided in this embodiment of this application is used—a quantity of I/Os in a unit time when the method provided in this embodiment of this application is not used)/a quantity of I/O times in a unit time when the method provided in this embodiment of this application is not used. White indicates (an average delay after the method provided in this embodiment of this application is used—an average delay when the method provided in this embodiment of this application is not used)/an average delay when the method provided in embodiments of this application is not used. It may be understood that, for a distributed storage service carried in a data center network, a main measurement indicator of service performance is a quantity of I/O times in a unit time. For example, a larger quantity of I/Os in a unit time indicates higher service performance. From (a) in FIG. 9, in the unit time, a quantity of I/O times after the method provided in this embodiment of this application is used is increased compared with a quantity of I/O times when the method provided in this embodiment of this application is not used, and is increased by a maximum of 50%. From (b) in FIG. 9 that an average delay is reduced, and is decreased by a maximum of 50%. Therefore, it is not difficult to understand that the method provided in this embodiment of this application helps improve network performance, and further improves service performance.

It should be understood that only the storage service types shown in FIG. 9 are only examples, and more storage service types may be included. For brevity, an effect diagram of reducing an average delay and increasing a quantity of I/O times per unit time of other storage service types is not shown.

Figure 10:
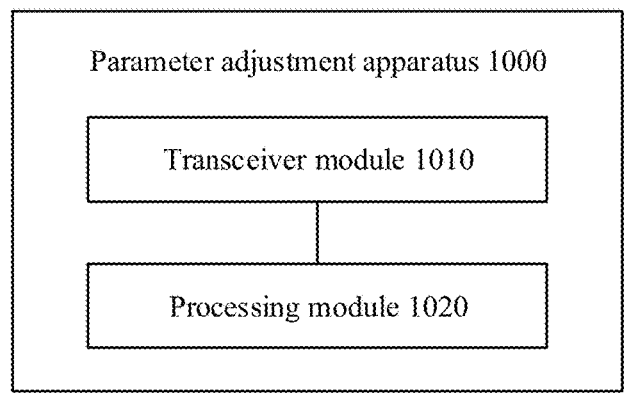
FIG. 10 is a schematic block diagram of a parameter adjustment apparatus according to an embodiment of this application.
Figure 11:
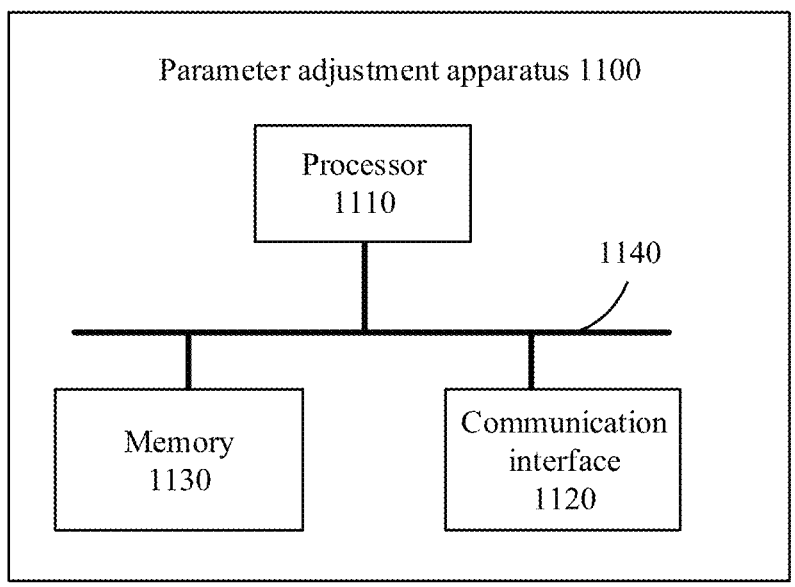
FIG. 11 is another schematic block diagram of a parameter adjustment apparatus according to an embodiment of this application.

The following describes in detail a parameter adjustment apparatus provided in an embodiment of this application with reference to FIG. 10 or FIG. 11.

FIG. 10 is a schematic block diagram of a parameter adjustment apparatus 1000 according to an embodiment of this application. As shown in FIG. 10, the apparatus 1000 may include a transceiver module 1010 and a processing module 1020.

Optionally, the apparatus 1000 may correspond to the first exploration device in the foregoing method embodiment, for example, may be the first exploration device, or a component configured in the first exploration device, for example, a chip or a chip system. In addition, modules in the apparatus 1000 may be configured to implement a corresponding procedure performed by the first exploration device in the methods shown in FIG. 5 to FIG. 8. For example, when the modules in the apparatus 1000 are configured to perform the steps in FIG. 5, the transceiver module 1010 may be configured to receive a first parameter set from a management device, and the processing module 1020 may be configured to obtain a network status of a first service node based on each parameter adjustment until the network status reaches a preset condition.

Optionally, the apparatus may correspond to the management device in the foregoing method embodiment, for example, may be the management device, or a component configured in the management device, for example, a chip or a chip system. In addition, the modules in the apparatus 1000 may be configured to implement a corresponding procedure performed by the management device in the methods shown in FIG. 5 or FIG. 8. For example. when the modules in the apparatus 1000 are configured to perform the steps in FIG. 5, the transceiver module 1010 may be configured to send the first parameter set to the first exploration device, and the processing module 1020 may be configured to determine the first parameter set, where the first parameter set includes one or more to-be-adjusted parameters.

It should be understood that a specific process in which the modules perform the foregoing corresponding steps has been described in detail in the foregoing method embodiments. For brevity, details are not described herein again.

It should be further understood that module division in embodiments of this application is an example, and is only logical function division. During actual implementation, there may be another division manner. In addition, functional modules in embodiments of this application may be integrated into one processor, or may exist alone physically, or two or more modules may be integrated into one module. The integrated module may be implemented in a form of hardware, or may be implemented in a form of a software functional module.

FIG. 11 is another schematic block diagram of a parameter adjustment apparatus 1100 according to an embodiment of this application. The apparatus 1100 may be a chip system, or may be an apparatus configured with a chip system, to implement a parameter adjustment function in the foregoing method embodiment. In this embodiment of this application, the chip system may include a chip, or may include a chip and another discrete device.

As shown in FIG. 11, the apparatus 1100 may include a processor 1110 and a communication interface 1120. The communication interface 1120 may be configured to communicate with another device through a transmission medium, so that an apparatus in the apparatus 1100 can communicate with the another device. The communication interface 1120 may be, for example, a transceiver, an interface, a bus, a circuit, or an apparatus that can implement a transceiver function. The processor 1110 may input and output data by using the communication interface 1120, and is configured to implement the parameter adjustment methods in the embodiments corresponding to FIG. 5 to FIG. 8. Specifically, the apparatus 1100 may be configured to implement a function of the first exploration device or a function of the management device in the foregoing method embodiment.

For example, if the apparatus 1100 is configured to implement the function of the first exploration device in the method shown in FIG. 5 provided in this embodiment of this application, the processor 1110 may be configured to control the communication interface 1120 to receive a first parameter set, and may be configured to obtain a network status of a first service node based on each parameter adjustment until the network status reaches a preset condition. For details, refer to detailed descriptions in the method embodiments. Details are not described herein again.

If the apparatus 1100 is configured to implement the function of the management device in the method shown in FIG. 5 provided in this embodiment of this application, the processor 1110 may be configured to control the communication interface 1120 to send the first parameter set, and may be configured to determine the first parameter set, where the first parameter set includes one or more to-be-adjusted parameters. For details, refer to detailed descriptions in the method examples. Details are not described herein again.

Optionally, the apparatus 1100 further includes at least one memory 1130, configured to store program instructions and/or data. The memory 1130 is coupled to the processor 1110. The coupling in this embodiment of this application may be an indirect coupling or a communication connection between apparatuses, units, or modules in an electrical form, a mechanical form, or another form, and is used for information exchange between the apparatuses, the units, or the modules. The processor 1110 may operate in collaboration with the memory 1130. The processor 1110 may execute the program instructions stored in the memory 1130. At least one of the at least one memory may be included in the processor.

In this embodiment of this application, a specific connection medium between the processor 1110, the communication interface 1120, and the memory 1130 is not limited. In this embodiment of this application, in FIG. 11, the processor 1110, the communication interface 1120, and the memory 1130 are connected through a bus 1140. The bus 1140 is represented by a thick line in FIG. 11, and a connection manner between other components is only described as an example, and is not limited thereto. The bus may be classified into an address bus, a data bus, a control bus, and the like. For ease of indication, only one thick line is used to represent the bus in FIG. 11. However, it does not mean that there is only one bus or only one type of bus.

This application further provides a computer program product. The computer program product includes a computer program (which may also be referred to as code or instructions). When the computer program is run, a computer is enabled to perform the method performed by the first exploration device or the method performed by the management device in the embodiments shown in FIG. 5 to FIG. 8.

This application further provides a computer-readable storage medium. The computer-readable storage medium stores a computer program (which may also be referred to as code or instructions). When the computer program is run, a computer is enabled to perform the method performed by the first exploration device or the method performed by the management device in the embodiments shown in FIG. 5 to FIG. 8.

It should be noted that the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware assembly. The processor may implement or perform the methods, steps, and logical block diagrams that are disclosed in embodiments of this application. The general-purpose processor may be a microprocessor, the processor may be any conventional processor, or the like. Steps of the methods disclosed with reference to embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (OM), a programmable read-only memory (ROM, PROM), an erasable programmable read-only memory (PROM, EPROM), an electrically erasable programmable read-only memory (EPROM, EEPROM), or a flash memory. The volatile memory may be a random access memory (RAM), and is used as an external cache. Through example but not limitative description, many forms of RAMs may be used, for example, a static random access memory (RAM, SRAM), a dynamic random access memory (RAM, DRAM), a synchronous dynamic random access memory (DRAM, SDRAM), a double data rate synchronous dynamic random access memory (SDRAM, DDR SDRAM), an enhanced synchronous dynamic random access memory (DRAM, ESDRAM), a synchronous link dynamic random access memory (synchlink DRAM, SLDRAM), and a direct rambus dynamic random access memory (RAM, DR RAM). It should be noted that the memory in the system and method described in this specification includes but is not limited to these memories and any memory of another proper type.

The terms such as "unit" and "module" used in this specification may indicate computer-related entities, hardware, firmware, combinations of hardware and software, software, or software being executed. It should be understood that, in embodiments of this application. "unit" and "module" have a same meaning, and may be used in a cross manner.

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. In the several embodiments provided in this application, it should be understood that the disclosed apparatus, device, and method may be implemented in other manners. For example, the described apparatus embodiments are only examples. For example, division into the units is only logical function division and may be other division during actual implementation. For example, a plurality of units or assemblies may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In the foregoing embodiments, all or some of the functions of the functional units may be implemented by using software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), or an optical medium (for example, a digital video disc (DVD)), a semiconductor medium (for example, a solid state disk (SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

A person skilled in the art can easily figure out another implementation solution of this application after considering the specification and practicing the application disclosed herein. This application is intended to cover any variations, functions, or adaptive changes of this application. These variations, functions, or adaptive changes comply with general principles of this application, and include common knowledge or a commonly used technical means in the technical field that is not disclosed in this application. The specification and the embodiments are only considered as examples, and the actual scope and the spirit of this application are pointed out by the following claims.

It should be understood that this application is not limited to the accurate structures that are described in the foregoing and that are shown in the accompanying drawings, and modifications and changes may be made without departing from the scope of this application. The scope of this application is limited only by the appended claims.

What is claimed is:

1. A parameter adjustment method, comprising:
receiving, by a first exploration device corresponding to a first service node, a first parameter set from a management device, wherein the first parameter set comprises one or more parameters used by the first exploration device to perform parameter adjustment, the first service node is any one of a plurality of service nodes comprised in a data center network, and the plurality of service nodes one-to-one correspond to a plurality of exploration devices; and obtaining, by the first exploration device, a network status of the first service node based on each parameter adjustment until the network status reaches a preset condition, wherein each parameter adjustment comprises:
adjusting one parameter in the first parameter set;
wherein the obtaining the network status of the first service node based on each parameter adjustment until the network status reaches the preset condition comprises:
repeatedly performing, by the first exploration device until the network status of the first service node reaches the preset condition, the following operations:
determining an adjustment policy based on the network status that is of the first service node and that is obtained based on a previous parameter adjustment, and a predefined reward function; and
performing a next parameter adjustment based on the determined adjustment policy, and obtaining the network status of the first service node.

2. The method according to claim 1, further comprising:
receiving, by the first exploration device, an adjustment range and/or adjustment step of adjusting each parameter in the first parameter set from the management device; and
wherein each parameter adjustment further comprises:
adjusting one parameter in the first parameter set based on a corresponding adjustment range and/or adjustment step.

3. The method according to claim 1, wherein the network status comprises a bandwidth, and the preset condition comprises:
the bandwidth reaches a first preset threshold; and/or
the network status comprises a quantity of congestion notification packets received by the first service node, and the preset condition comprises:
the quantity of congestion notification packets received by the first service node is less than a second preset threshold.

4. The method according to claim 1, wherein the adjustment policy further comprises: an adjustment direction for a same parameter, or an adjustment for another parameter.

5. The method according to claim 1, further comprising:
determining, by the first exploration device, a second parameter set, which is obtained by adjusting at least one parameter in the first parameter set, and one or more parameters in the second parameter set enable the network status to meet the preset condition.

6. The method according to claim 1, further comprising:
determining, by the first exploration device, a modification coefficient based on the second parameter set, wherein the modification coefficient is used to modify the reward function, and a modified reward function is used to determine the adjustment policy-based on the one or more parameters in the second parameter set being adjusted.

7. The method according to claim 1, wherein the first exploration device is deployed on the first service node, or the first exploration device is deployed on a switch connected to the first service node.

8. A parameter adjustment method, comprising: determining, by a management device, a first parameter set, which comprises one or more parameters used by a first exploration device to perform parameter adjustment, wherein the first exploration device corresponds to a first service node which is any one of a plurality of service nodes comprised in a data center network, and the plurality of service nodes one-to-one correspond to a plurality of exploration devices; and
sending, by the management device, the first parameter set to the first exploration device;
wherein the method further comprising:
receiving, by the management device, a modification coefficient, determined by the first exploration device based on a second parameter set, wherein the second parameter set is obtained by the first exploration device by adjusting at least one parameter in the first parameter set, and one or more parameters in the second parameter set enable a network status to meet a preset condition; and
modifying, by the management device, a predefined reward function based on one or more modification coefficients, wherein a modified predefined reward function is used to determine an adjustment policy based on the one or more parameters in the second parameter set being adjusted.

9. The method according to claim 8, further comprising:
sending, by the management device, an adjustment range and/or adjustment step of adjusting each parameter in the first parameter set to the first exploration device.

10. The method according to claim 8, wherein the adjustment policy further comprises:
an adjustment direction for a same parameter, or an adjustment for another parameter.

11. The method according to claim 8, wherein the network status comprises a bandwidth, and the preset condition comprises:
the bandwidth reaches a first preset threshold; and/or
the network status comprises a quantity of congestion notification packets received by the first exploration device, and the preset condition comprises: the quantity of congestion notification packets received by the first exploration device is less than a second preset threshold.

12. The method according to claim 8, wherein the management device is deployed on a management node in the data center network, or the management device is deployed on a switch connected to a management node.

13. A parameter adjustment apparatus, comprising:
a processor;
a memory coupled to the processor and storing program instructions, which, upon being executed by the processor, cause the apparatus to:
receive a first parameter set from a management device, wherein the first parameter set comprises one or more parameters used by the apparatus to perform parameter adjustment; and
obtain a network status of a first service node based on each parameter adjustment until the network status reaches a preset condition, wherein each parameter adjustment comprises: adjusting one parameter in the first parameter set, wherein
the first service node is any one of a plurality of service nodes comprised in a data center network, the plurality of service nodes one-to-one correspond to a plurality of exploration devices, and the apparatus corresponds to a first exploration device that is in the plurality of exploration devices and that corresponds to the first service node;
wherein the program instructions upon being executed by the processor further cause the apparatus to:
repeatedly perform, until the network status of the first service node reaches the preset condition, the following operations:

determining an adjustment policy based on the network status that is of the first service node and that is obtained based on a previous parameter adjustment, and a predefined reward function; and performing a next parameter adjustment based on the determined adjustment policy, and obtaining the network status of the first service node.

14. The apparatus according to claim 13, wherein the program instructions upon being executed by the processor further cause the apparatus to:

receive an adjustment range and/or adjustment step of adjusting each parameter in the first parameter set from the management device; and adjust one parameter in the first parameter set based on a corresponding adjustment range and/or adjustment step.

15. The apparatus according to claim 13, wherein the network status comprises a bandwidth, and the preset condition comprises: the bandwidth reaches a first preset threshold; and/or the network status comprises a quantity of congestion notification packets received by the first service node, and the preset condition comprises: the quantity of congestion notification packets received by the first service node is less than a second preset threshold.

16. The apparatus according to claim 13, wherein the adjustment policy further comprises:

an adjustment direction for a same parameter, or an adjustment for another parameter.

17. The apparatus according to claim 13, wherein the program instructions upon being executed by the processor further cause the apparatus to:

determine a second parameter set, which is obtained by adjusting at least one parameter in the first parameter set, and wherein one or more parameters in the second parameter set enable the network status to meet the preset condition.

18. The apparatus according to claim 13, wherein the program instructions upon being executed by the processor further cause the apparatus to:

determine a modification coefficient based on the second parameter set, wherein the modification coefficient is used to modify the reward function, and a modified reward function is used to determine the adjustment policy based on the one or more parameters in the second parameter set being adjusted.

19. The apparatus according to claim 13, wherein the apparatus is deployed on the first service node, or the apparatus is deployed on a switch connected to the first service node.

20. A parameter adjustment apparatus, comprising:

a processor;

a memory coupled to the processor and storing program instructions, which upon being executed by the processor, cause the apparatus to:

determine a first parameter set, which comprises one or more parameters used by a first exploration device to perform parameter adjustment, wherein the first exploration device corresponds to a first service node which is any one of a plurality of service nodes comprised in a data center network, and the plurality of service nodes one-to-one correspond to a plurality of exploration devices; and send the first parameter set to the first exploration device;

wherein the program instructions upon being executed by the processor further cause the apparatus to:

receive a modification coefficient, which is determined by the first exploration device based on a second parameter set, wherein the second parameter set is obtained by the first exploration device by adjusting at least one parameter in the first parameter set, and one or more parameters in the second parameter set enable a network status to meet a preset condition; and modify a predefined reward function based on one or more modification coefficients, wherein a modified predefined reward function is used to determine an adjustment policy based on the one or more parameters in the second parameter set being adjusted.

21. The apparatus according to claim 20, wherein the program instructions upon being executed by the processor further cause the apparatus send an adjustment range and/or adjustment step of adjusting each parameter in the first parameter set to the first exploration device.

22. The apparatus according to claim 20, wherein the adjustment policy further comprises:

an adjustment direction for a same parameter, or an adjustment for another parameter.

23. The apparatus according to claim 20, wherein the network status comprises a bandwidth, and the preset condition comprises: the bandwidth reaches a first preset threshold; and/or the network status comprises a quantity of congestion notification packets received by the first exploration device, and the preset condition comprises: the quantity of congestion notification packets received by the first exploration device is less than a second preset threshold.

24. The apparatus according to claim 20, wherein the apparatus is deployed on a management node in the data center network, or the apparatus is deployed on a switch connected to a management node.

* * * * *